United States Patent
Lee et al.

(10) Patent No.: US 11,473,677 B2
(45) Date of Patent: Oct. 18, 2022

(54) DRIVING MODULE AND TRANSMISSION

(71) Applicant: LG INNOTEK CO., LTD., Seoul (KR)

(72) Inventors: Young Wuk Lee, Seoul (KR); Chan Seok Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 813 days.

(21) Appl. No.: 16/464,593

(22) PCT Filed: Dec. 13, 2017

(86) PCT No.: PCT/KR2017/014656
§ 371 (c)(1),
(2) Date: May 28, 2019

(87) PCT Pub. No.: WO2018/110977
PCT Pub. Date: Jun. 21, 2018

(65) Prior Publication Data
US 2021/0095762 A1  Apr. 1, 2021

(30) Foreign Application Priority Data

Dec. 14, 2016 (KR) .................. 10-2016-0170053
Jan. 4, 2017 (KR) .................. 10-2017-0001280
Jan. 10, 2017 (KR) .................. 10-2017-0003393

(51) Int. Cl.
*F16H 61/28* (2006.01)
*H02K 11/215* (2016.01)
(Continued)

(52) U.S. Cl.
CPC ............ *F16H 61/28* (2013.01); *H01F 7/081* (2013.01); *H01F 7/1844* (2013.01);
(Continued)

(58) Field of Classification Search
CPC ............ F16H 61/28; F16H 2061/2853; F16H 2063/305; H01F 7/081; H01F 7/1844; H01F 2007/185; H01F 7/1615; H02K 11/215
See application file for complete search history.

(56) References Cited

U.S. PATENT DOCUMENTS

| 5,523,684 A | 6/1996 | Zimmermann |
| 2011/0023649 A1 | 2/2011 | Kim et al. |

(Continued)

FOREIGN PATENT DOCUMENTS

| CN | 102128253 A | 7/2011 |
| CN | 103812277 A | 5/2014 |

(Continued)

*Primary Examiner* — Mohamad A Musleh
(74) *Attorney, Agent, or Firm* — Birch, Stewart, Kolasch & Birch, LLP

(57) ABSTRACT

A driving module comprises: a housing; a housing; a solenoid comprising a shaft arranged inside the housing so as to make a straight movement; and a printed circuit board arranged on the solenoid, wherein the solenoid comprises a stator, a plunger arranged inside the stator, a shaft coupled to the plunger, and a sensor magnet arranged on the upper side of the shaft, and the printed circuit board comprises a hole penetrated by the shaft and comprises a position detecting sensor arranged on the printed circuit board to be adjacent to the hole.

20 Claims, 18 Drawing Sheets

(51) Int. Cl.
*H01F 7/08* (2006.01)
*H01F 7/18* (2006.01)
*F16H 63/30* (2006.01)

(52) U.S. Cl.
CPC .... *H02K 11/215* (2016.01); *F16H 2061/2853* (2013.01); *F16H 2063/305* (2013.01); *H01F 2007/185* (2013.01)

(56) References Cited

U.S. PATENT DOCUMENTS

| | | |
|---|---|---|
| 2011/0290056 A1 | 12/2011 | Garuz Rodes et al. |
| 2014/0167572 A1 | 6/2014 | Woo |

FOREIGN PATENT DOCUMENTS

| | | | |
|---|---|---|---|
| CN | 104948813 A | 9/2015 | |
| DE | 19922427 A1 | 11/2000 | |
| DE | 102006030793 A1 | 1/2008 | |
| EP | 2744087 A2 * | 6/2014 | ........... H02K 11/215 |
| GB | 1571769 A | 7/1980 | |
| JP | 2014-121262 A | 6/2014 | |
| JP | 2016-530464 A | 9/2016 | |
| JP | 2016-178203 A | 10/2016 | |
| KR | 10-2001-0010536 A | 2/2001 | |
| KR | 10-2011-0045750 A | 5/2011 | |
| KR | 10-1370529 B1 | 3/2014 | |
| KR | 10-1559162 B1 | 10/2015 | |

* cited by examiner

DRIVING MODULE AND TRANSMISSION

CROSS REFERENCE TO RELATED APPLICATIONS

This application is the National Phase of PCT International Application No. PCT/KR2017/014656, filed on Dec. 13, 2017, which claims priority under 35 U.S.C. 119(a) to Patent Application No. 10-2016-0170053, filed in the Republic of Korea on Dec. 14, 2016, Patent Application No. 10-2017-0001280, filed in the Republic of Korea on Jan. 4, 2017, and Patent Application No. 10-2017-0003393, filed in the Republic of Korea on Jan. 10, 2017, all of which are hereby expressly incorporated by reference into the present application.

TECHNICAL FIELD

The present invention relates to a driving module and a transmission.

BACKGROUND ART

Unlike a single plate clutch transmission mounted in a conventional manual transmission vehicle, a dual clutch transmission is a system provided with two sets of clutches capable of implementing odd-numbered gears on one set of clutches and even-numbered gears on the other remaining set of clutches, and it has been widely used exhibiting a high fuel efficiency due to the advantages of easy manipulation and especially fast shift time.

The dual clutch transmission comprises a dual clutch comprising two sets of clutches, a shift lever that receives power from the dual clutch and sets each of gear shift stages, and an electronic control unit (Transmission Control Unit) for electronically controlling the clutch actuator and the shift actuator by receiving various kinds of vehicle information such as vehicle speed and shift commands.

The clutch actuator and the gear actuator of the above configuration, use a number of gear devices and the lead screws or the like to implement the selecting and shifting operations. As devices for implementing the operation, a motor and a solenoid provide a rotational driving force and a linear movement driving force respectively within a housing.

FIG. 1 is a cross-sectional view of a structure of the prior art for detecting the position of a solenoid.

Referring to FIG. 1, the solenoid 1 according to a prior art comprises a stator 5 arranged inside the housing, a plunger 6 arranged inside the stator 5, and a shaft 7 coupled to the plunger 6.

The shaft 7 can be linearly moved by the electromagnetic interaction between the plunger 6 and the stator 5. To this end, the coils are wound on the stator 5, and the coils and the magnetized plungers can act on each other electromagnetically.

Meanwhile, a sensor magnet 8 is arranged at an end of the shaft 7 in order to sense the position of the shaft 7. A printed circuit board 3 on which the position detecting sensor 2 facing the sensor magnet 8 is mounted is provided on either side being spaced apart from the solenoid 1. Therefore, the position of the shaft 7 can be detected by the position detecting sensor 2 by detecting the magnetic force generated in the sensor magnet 8 according to the movement of the shaft 7.

According to the above described configuration, the structure of the prior art for detecting the position of a solenoid has the following problems.

Considering the movement path of the shaft 7, the position detecting sensor 2 should be arranged at a distance spaced apart from the solenoid 1. However, considering the limited space of the housing in which the solenoid 1 and the printed circuit board 3 are arranged, the gap between the position detecting sensor 2 and the shaft 7 increases the overall size of the device. In recent years, keeping in mind the trends that electric components arranged in automobiles are miniaturized, the arrangement of each component within a limited space must be made taking into account of the overall size of the product.

FIG. 2 is a cross-sectional view of another structure of the prior art for detecting the position of a solenoid.

Referring to FIG. 2, according to the prior art, in the structure for detecting the position of a solenoid, the magnetic field formed in the sensor magnet 8 is affected by the printed circuit board 3 and the structure (not shown) above the shaft. That is, due to the positions of the N pole and the S pole formed at the upper and lower portions respectively of the sensor magnet 8, the magnetic flux output from the N pole is highly affected by the external disturbance in the process of entering into the S pole. It is a problem of the prior art technology that the measurement error is high in detecting the position of the shaft 7.

DETAILED DESCRIPTION OF THE INVENTION

Technical Subject

An objective of the present invention is to provide a driving module and a transmission comprising a structure for detecting the position of a solenoid wherein the vertical movement of an object is detected with a low error rate without the influence of external disturbance.

Another objective of the present invention is to provide a driving module and a transmission that can reduce the size and the manufacturing cost of the product by reducing the number of parts.

Technical Solution

In one embodiment, a driving module comprises: a housing; a solenoid comprising a shaft arranged inside the housing so as to make a straight movement; and a printed circuit board arranged on the solenoid, wherein the solenoid comprises a stator, a plunger arranged inside the stator, a shaft coupled to the plunger, and a sensor magnet arranged on the upper side of the shaft, and the printed circuit board comprises a hole penetrated by the shaft and comprises a position detecting sensor arranged on the printed circuit board to be adjacent to the hole.

The printed circuit board may be arranged between the position detecting sensor and the solenoid.

The shaft may move down or up between a first position of an upper limit and a second position of a lower limit in both directions of the central axis of the shaft in accordance with the movement of the plunger.

The position detecting sensor may be a three-axis Hall sensor for detecting, magnetic flux in X, Y and Z directions.

The sensor magnet comprises N pole and S pole, the N pole and the S pole of the sensor magnet are arranged on the X axis, and the position detecting sensor may be arranged spaced apart from the sensor magnet by a predetermined distance.

The N pole of the sensor magnet may be arranged to face the position detecting sensor.

A cover arranged on the upper side of the housing may be comprised.

The cover may have a protrusion seating groove recessed upwardly corresponding to the position of the shaft.

A seating member may be provided between the protrusion seating groove and the shaft, and an outer diameter of the seating member may correspond to an inner diameter of the projection seating groove.

The area of the upper surface of the cover where the protrusion seating groove is formed may be more upwardly protruded than the other area.

The housing may comprise an exposure hole through which the shaft of the solenoid protrudes.

A shift lever may be coupled to an end of the shaft protruding through the exposure hole.

The exposure hole and the hole may be formed in the same axial direction.

The solenoid may comprise a solenoid cover surrounding the shaft and the sensor magnet.

The solenoid cover comprises a cylindrical protrusion corresponding to the shape of the shaft, and the protrusion can be coupled to the hole.

The protrusion may comprise a stepped portion formed with a step in the lower partial region thereof, wherein the outer diameter of the stepped portion may be larger than the outer diameter of the hole, and the outer diameter of the protrusion may be smaller than the outer diameter of the hole.

The upper surface of the stepped portion can be in contact with the lower surface of the printed circuit board.

In yet another embodiment, a driving module comprises a housing; a motor arranged within the housing; a solenoid arranged within the housing and spaced apart from the motor; a cover coupled to the housing; and a printed circuit board arranged between the housing and the cover, wherein the housing comprises a first accommodating portion in which the motor is arranged and a second accommodating portion in which the solenoid is arranged, and the motor and the solenoid are electrically connected to the circuit board.

The solenoid comprises a stator; a plunger arranged within the stator; a shaft coupled with the plunger; and a sensor magnet arranged on the shaft, wherein the printed circuit board may comprise a hole through which the shaft is penetrating.

The housing may comprise a third accommodating portion in which the printed circuit board is arranged.

In another embodiment, a transmission comprises a driving module for shifting the gear by providing a driving force through a plurality of clutches; a clutch actuator for selectively operating any one of the plurality of clutches; and a control unit for controlling the power module and the clutch actuator, wherein the driving module comprises: a housing: a solenoid arranged inside the housing and comprising a linearly moving shaft; and a printed circuit board arranged on the solenoid, wherein the solenoid comprises a stator; a plunger arranged within the stator; a shaft coupled with the plunger; and a sensor magnet arranged on the upper side of the shaft, and wherein the printed circuit board comprises a hole through which the shaft is penetrating, and a position detecting sensor arranged on the printed circuit board, adjacent to the hole.

In another embodiment, a transmission comprises a driving module for shifting the gear by providing a driving force through a plurality of clutches; a clutch actuator for selectively operating any one of the plurality of clutches; and a control unit for controlling the power module and the clutch actuator, wherein the driving module comprises: a housing; a motor arranged inside the housing; a solenoid arranged inside the housing and spaced apart from the motor; a cover coupled to the housing; and a printed circuit board arranged between the housing and the cover, wherein the housing comprises a first accommodating portion in which the motor is arranged and a second accommodating portion in which the solenoid is arranged, and wherein the motor and the solenoid are electrically connected to the printed circuit board.

Advantageous Effects of the Invention

The driving module and the transmission according to the present invention can detect the position of an object with a low error rate without the influence of external disturbance.

In addition, since an insertion hole for inserting a solenoid into the printed circuit board is formed, a separate space is not required between the printed circuit board and the solenoid, which makes it possible to further miniaturize the product.

In addition, since the position detecting sensor is arranged on the upper surface of the printed circuit board to sense the magnetic force of the sensor magnet coupled to the end of the shaft, a change in the position of the shaft can be detected more easily.

Further, by forming a seating groove wherein the solenoid is recessed into the inner surface of the housing, the solenoid can be more firmly supported inside the housing.

Further, by providing a plurality of parts in a single housing, there is an advantage that the driving module becomes smaller and more compact.

In addition, a motor and a solenoid, which are conventionally connected by wires, are mounted on a single printed circuit board and a control command is transmitted, thereby reducing the number of required wires and parts. Accordingly, the manufacturing cost can be reduced.

Further, by forming a space portion in which each electronic component is arranged in the housing, an unnecessary space disappears and the manufacturing process is facilitated.

BEST MODE

Figure 1:
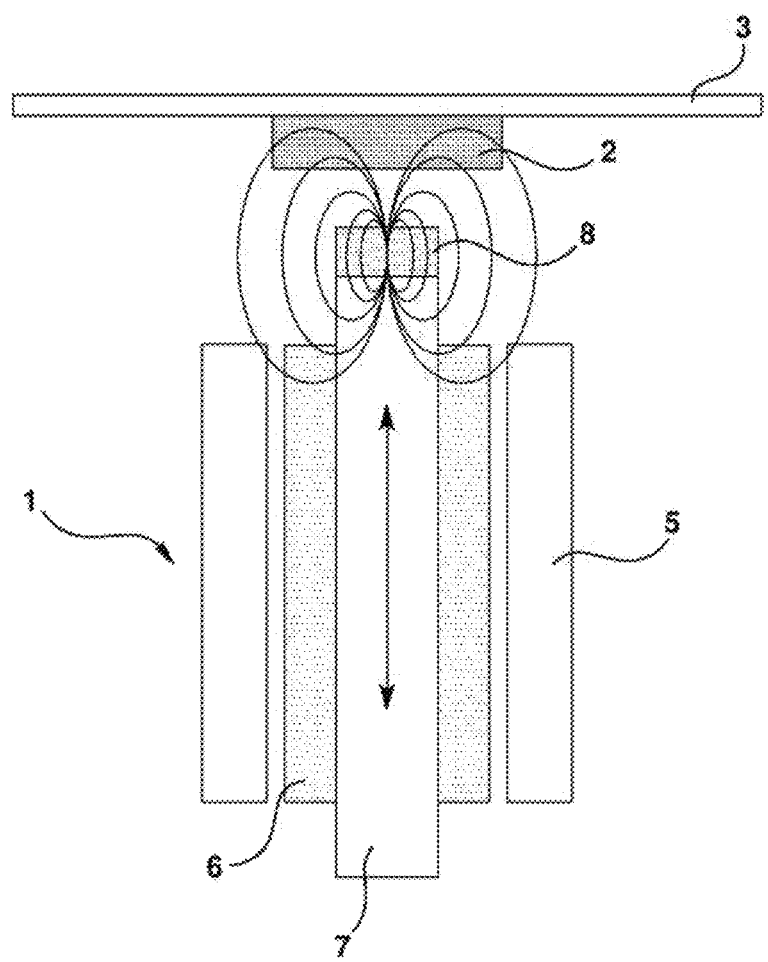
FIG. 1 is a sectional view of a structure of the prior art for detecting the position of a solenoid.

Since the present invention, which will be described hereinafter, may apply to various modifications and may have various exemplary embodiments, some specific exemplary embodiments are illustrated in the drawings and will be described in detail in the detailed description.

This, however, is by no means to restrict the invention to the specific embodiments, it is to be understood as embracing all modifications, equivalents and substitutes included in the spirit and scope of the present invention. If the specific description of the related art in the following description of the present invention that are determined to obscure the gist of the invention, the detailed description thereof is omitted.

The terms used in the present specification are merely used to describe particular exemplary embodiments, and are not intended to limit the present invention. Expressions in singular forms include plural forms unless the context clearly indicates otherwise. In this application, the terms "comprise," "have," and the like are intended to specify the features, numbers, steps, actions, components, parts, or one that exists combinations thereof described in the specification, but are not intended to preclude the one or more other features, numbers, steps, actions, components, parts, or the presence or possibility of combinations thereof.

Further, terms such as "first," "second" may be used to separately describe various elements, but the above elements shall not be restricted to the above terms. These terms are only used to distinguish one element from the other.

The driving module described in this specification comprises a motor and a solenoid for causing mechanical motion, and a control unit for controlling the motor and the solenoid, and it may be provided in an engine, an automatic transmission, a manual transmission, a steering system, a brake system, an electric pump, a suspension, and the like provided in a system having electric components such as a vehicle, a ship, and an airplane.

Hereinafter, the driving module according to the present embodiment will be described as an example of a gear actuator that shifts gears in a dual clutch transmission having two clutches for convenience of explanation. However, the driving module is not limited to a gear actuator, but may be applied in various types of machines, including the types described above.

Figure 3:
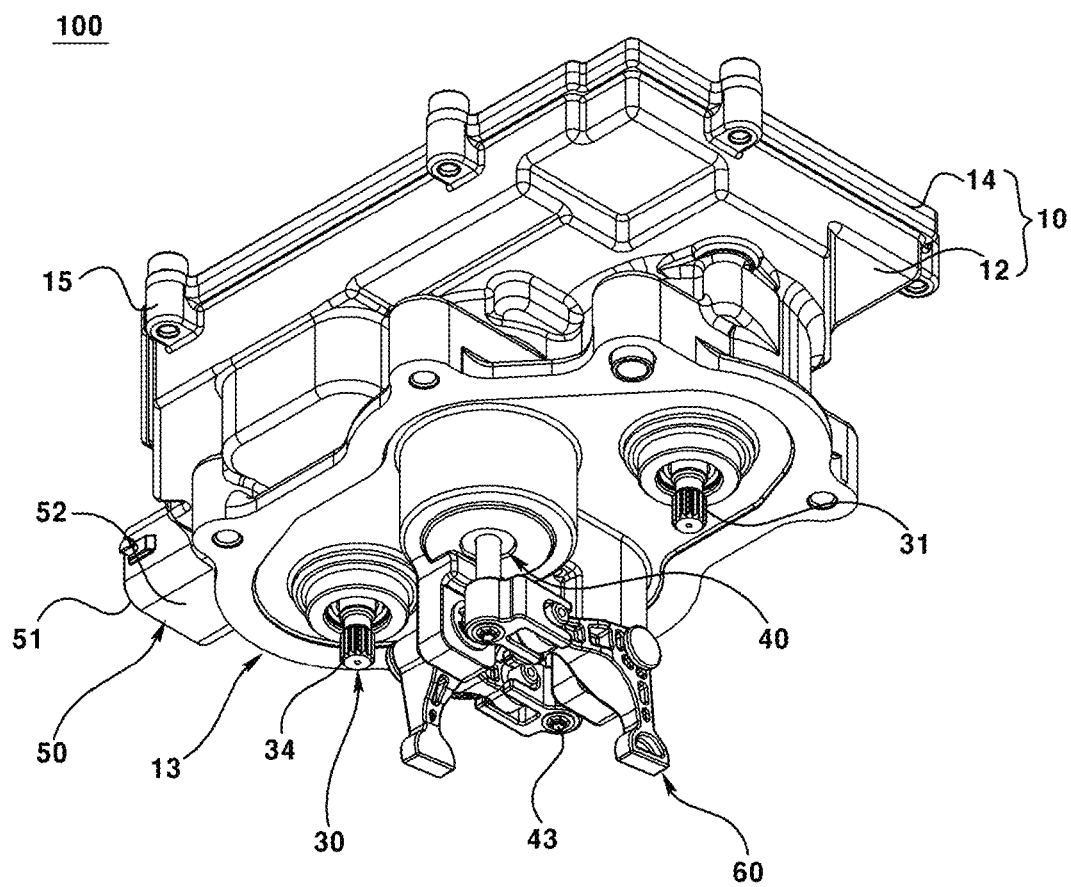
FIG. 3 is a perspective view of a driving module according to a first embodiment of the present invention.
Figure 4:
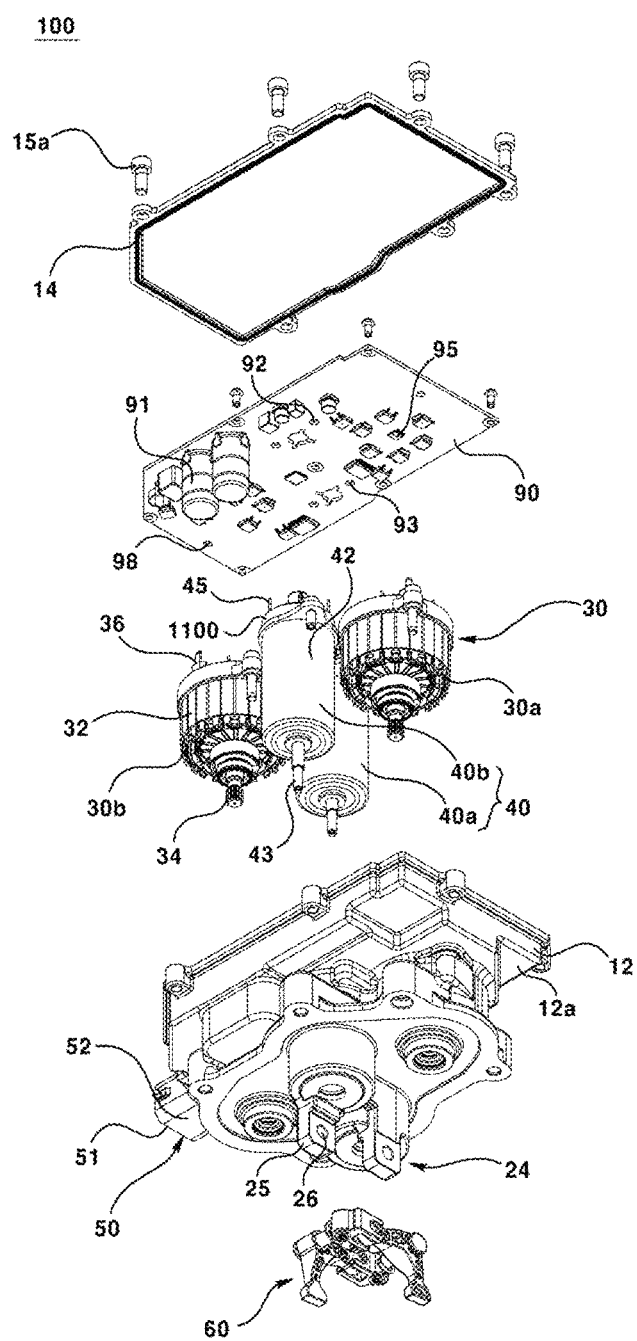
FIG. 4 is an exploded perspective view of a driving module according to the first embodiment of the present invention.

FIG. 3 is a perspective view of a driving module according to a first embodiment of the present invention: FIG. 4 is an exploded perspective view of a driving module according to the first embodiment of the present invention; and FIG. 5 is an internal cross-sectional view of a driving module according to the first embodiment of the present invention.

Figure 5:
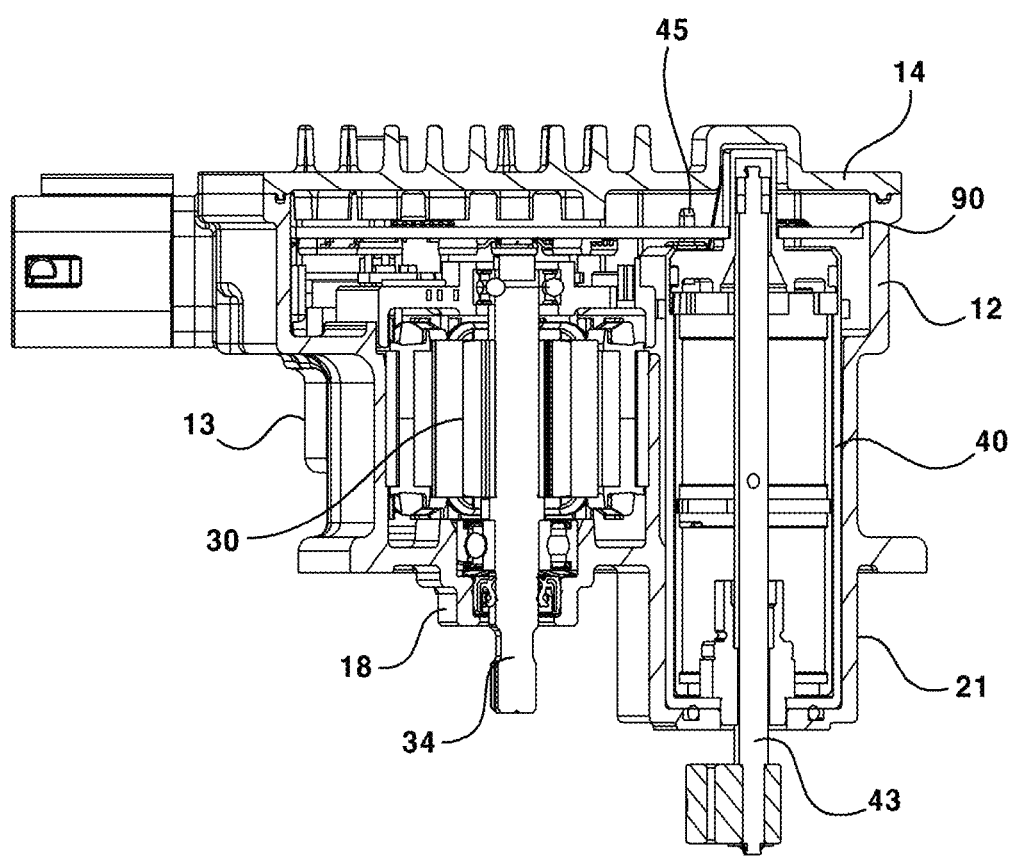
FIG. 5 is an internal cross-sectional view of a driving module according to the first embodiment of the present invention.

Referring to FIGS. 3 to 5, the driving module 100 according to the first embodiment of the present invention comprises a case 10 forming an outer appearance, a motor 30 and a solenoid 40 arranged inside the case 10 to generate a driving force, a printed circuit board 90 also arranged inside the case 10 for controlling the motor 30 and the solenoid 40, and a shift lever 60 to perform shifting by transmitting the driving force of the solenoid 40 or the motor 30.

The case 10 forms the appearance of the drive module 100. Specifically, the case 10 comprises a housing 12 and a cover 14 arranged on the upper side of the housing 12. Therefore, the motor 30, the solenoid 40, and the printed circuit board 90 are arranged in the inner space formed by the coupling of the housing 12 and the cover 14.

The housing 12 and the cover 14 can be coupled through a screw-coupling. The screw-coupling can be made by forming a screw coupling portion 15 wherein holes allowing the passing of the screws are formed in the regions corresponding to each other and inserting the screw 15*a* into the screw coupling portion 15. The screw coupling portion 15 may be arranged at each corner of the rectangular housing 12 and the cover 14. Separate screws 15*a* may be coupled to the screw coupling portion 15 so that the housing 12 and the cover 14 may be coupled.

Alternatively, the coupling between the housing 12 and the cover 14 may be configured such that an engagement protrusions and an engagement grooves are formed on the peripheral edges of the both structures, respectively, so that the engagement protrusions are inserted into the engagement grooves.

On the other hand, a coupling portion for coupling the driving module 100 with other components in the system may be separately provided on the outer surface of the cover 14.

A connector 50 for electrical connection with other components may be provided on the outside of the housing 12. The connector 50 may comprise a connector body 52 having a connection hole 51 formed at the center thereof. A terminal for electrical connection with other components is mounted or provided on the printed circuit board 90 so that the terminal may be in contact with the connector 50 and exposed to the outside of the case 10 through the connection hole 51. Therefore, when the plug inserted in a separate wire is inserted into the connection hole 51 and brought into contact with the terminal, electrical coupling is established between the driving module 100 and another electronic components. The electrical coupling is for controlling the motor 30 and the solenoid 40, which will be described later.

Alternatively, the connector 50 may be a power terminal for supplying power to the driving module 100. Accordingly, when the separate power supply unit is electrically connected through the connector 50, power can be supplied to the driving module 100.

The printed circuit board 90 is accommodated on the upper side of the housing 12. Various electronic components 91 are mounted on the printed circuit board 90. That is, the printed circuit board 90 is understood as a circuit board on which various electronic components are mounted. As described above, the printed circuit board 90 may be provided with terminals for electrical coupling with other electronic components. Elements extending from the upper side of the motor 30 and the solenoid 40 are electrically connected or mounted on the lower side of the printed circuit board 90 so that operation of the motor 30 and the solenoid 40 can be performed according to the control command of the printed circuit board 90.

The printed circuit board 90 is provided with sensor units 95 and 97 for detecting the driving of the motor 30 and the solenoid 40. The sensor units 95 and 97 comprise a rotation sensor 95 for detecting the rotational driving force of the motor 30 and a position detecting sensor 97 for detecting the linear movement of the solenoid 40.

It is understood that the printed circuit board 90, as a control part, receives the control command of the control unit 300 (see FIG. 13) or the operating state of the clutch actuator 200 to be described later, and operates the motor 30 and the solenoid 40 to shift the gear. Alternatively, it may be configured in a way that the shifting operation of the motor 30 and the solenoid 40 is controlled in accordance with a self-control command of the printed circuit board 90.

Hereinafter, the configurations of the motor 30 and the solenoid 40 will be described.

A plurality of motors 30 and solenoids 40 are provided in the driving module 100 according to the embodiment of the present invention. For example, the number of the motors 30 and the number of the solenoids 40 may be two.

More specifically, the motor 30 comprises a first motor 30a and a second motor 30b, which are arranged on the lower side of the printed circuit board 90 among the internal spaces of the case 10, respectively. The first motor 30a and the second motor 30b may be arranged to face each other.

Each of the motors 30a and 30b comprises a motor body 32, a driver coupling portion 36 arranged on the upper surface of the motor body 32 for electrical connection with the printed circuit board 90, and a rotating shaft 34 protruding downward from the motor 30 to transmit the rotational driving force of the motor 30 to the outside.

The motor 30 is configured to convert electric energy into kinetic energy of rotational force, and a shifting operation of a gear to be described later is performed through the rotational force of the motor 30. At this time, the first motor 30a performs the shifting operation of the odd-numbered gears 1, 3, 5 and 7 and the second motor 30b performs the shifting operation of the shift gears 2, 4, 6, and R. The operation process will be described later.

The rotating shaft 34 may be connected to a conversion device that converts the rotational driving force generated by the motor 30 into a driving force of a linear motion. For example, the conversion device may be configured to be coupled to the rotating shaft 34 from the outside of the case 10.

The solenoid 40 comprises a first solenoid 40a and a second solenoid 40b which are respectively arranged on the lower side of the printed circuit board 90 in the inner space of the case 10. The plurality of solenoids 40a and 40b are arranged to face each other. The plurality of motors 30a and 30b and the plurality of solenoids 40a and 40b can be arranged alternately.

Each of the solenoids 40a and 40b comprises a solenoid housing 42, a driver coupling portion 45 arranged above the solenoid housing 42 for electrical connection between the solenoid housing 42 and the printed circuit board 90, and a shaft 43 protruding downward from the housing 42 to transmit the driving force of the solenoid 40.

The shaft 43 may be parallel to the rotating shall 34 of the motor 30.

The solenoid 40 is configured to convert the supplied electric energy into kinetic energy for linear motion of the shaft 43, and a selecting operation of a gear to be described later is performed through the linear motion of the shaft 43. At this time, the first solenoid 40a performs the selecting operation of the odd-numbered gears 1, 3, 5, and 7, and the second solenoid 40b performs the selecting operation of the even-numbered gears 2, 4, 6, and R.

The motor 30 and the solenoid 40 are provided with driver coupling portions 36 and 45 for coupling with the printed circuit board 90. For example, the driver coupling portions 36 and 45 may be pins protruding from the outer surface. When the driver coupling portions 36 and 45 are electrically connected to the printed circuit board 90, power can be supplied to the motor 30 and the solenoid 40. In consideration of this, the driver coupling portions 36 and 45 may be referred to as a power supply pin.

The printed circuit board 90 may be formed with pinholes 93 and 98 to which the motor 30 and the driver coupling portions 36 and 45 of the solenoid 40 are coupled. A plurality of pinholes 93 and 98 are provided corresponding to the number and position of the drive coupling portions 36 and 45.

The driver coupling portions 36 and 45 may be press-fit pins. Therefore, the driver coupling portions 36 and 45 can be inserted and fixed in the pinholes 93 and 98 formed in the printed circuit board 90.

Figure 6:
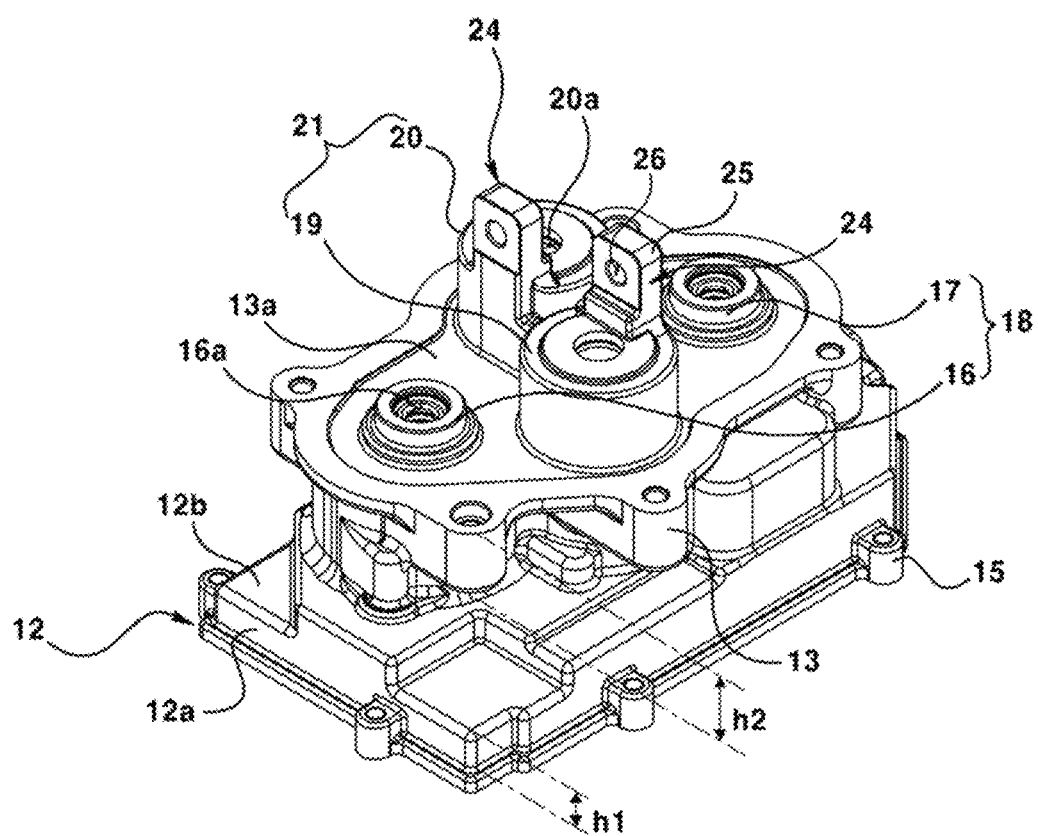
FIG. 6 is a perspective view showing a bottom surface of a housing according to the first embodiment of the present invention.

FIG. 6 is a perspective view showing a bottom surface of the housing according to the first embodiment of the present invention.

For convenience of explanation, FIG. 6 shows a state where the upper and lower sides of the housing 12 are interchanged.

Referring to FIGS. 3 to 6, an internal space in which electronic components are arranged is formed in the case 10 formed by the engagement of the housing 12 and the cover 14 as described above.

The cover 14 is formed in the shape of a rectangular plate to form the upper portion of the case 10.

The housing 12 is formed so that its end surface corresponds to the end surface of the cover 14. The housing 12 comprises a first space portion 12a formed to be recessed to have a first height h1 downwardly from the lower surface of the housing 12 facing the cover 14, a portion of the lower surface 12b of the first space portion 12a is downwardly recessed to comprise a second space portion 13 having the second height h2.

The cross-sectional area of the first space portion 12a may correspond to or slightly greater than the cross-sectional area of the printed circuit board 90 to accommodate the printed circuit board 90 therein.

The cross-sectional shape of the second space portion 13 is formed so as to correspond to the area where the motor 30 and the solenoid 40 are arranged on the lower surface 12b of the first space portion 12a. This is understood as a configuration in which the second space portion 13 is designed to form an arrangement region of the motor 30 and the solenoid 40 in the inner space of the case 10.

A first accommodating portion 18 and a second accommodating portion 21 are formed on the lower surface 13a of the second space portion 13 so as to accommodate a portion of the motor 30 and the solenoid 40. Here, the first accommodating portion 18 is understood as a motor accommodating portion, and the second accommodating portion 21 is understood as a solenoid accommodating portion.

More specifically, the first accommodating portion 18 is formed so that a portion of the lower surface 13*a* of the second space portion 13 protrudes downward so as to correspond to the arrangement region of the motor 30. As shown in the drawing, two motors 30 are arranged, and therefore, the first accommodating portion 18 is provided with a first motor seating portion 16 and a second motor seating portion 17 corresponding to the number of the motors 30. A through hole 16*a* for exposing the rotating shaft 34 of the motor 30 to the outside of the case 10 is formed on the lower surface of the first accommodating portion 18. The rotating shaft 34 can be coupled with another structure via the through hole 16*a* when the motor 30 is mounted on the case 10 to transmit the driving force of the motor 30 for the operation of gear shifting.

The sum of the first height h1, the second height h2 and the height of the first accommodating portion 18 from the lower surface of the cover 14 may correspond to or be greater than the height of the body 32 of the motor 30 mounted on the printed circuit board 90.

A portion of the lower surface 13*a* of the second space portion 13 is protruded downward so as to correspond to the arranged region of the solenoid 40. The second accommodating portion 21 comprises a first solenoid seating portion 19 and a second solenoid seating portion 20 corresponding to the number of the solenoids 40. A through hole 20*a* for exposing the shaft 43 of the solenoid 40 to the outside of the case 10 is formed on the lower surface of the second accommodating portion 21. The shaft 43 can be coupled with the other structure via the through hole 20*a* when the solenoid 40 is mounted to the case 10 and can transmit the driving force of the solenoid 40 for the operation of gear selecting.

Therefore, the sum of the first height h1, the second height h2, and the height of the second accommodating portion 21 from the lower surface of the cover 14 may correspond to or be greater than the height of the solenoid 40 mounted on the printed circuit board 90.

A lever coupling portion 24 is arranged on one side of the lower surface of the second accommodating portion 21 so that a shift lever 60 for selecting a gear is coupled.

Hereinafter, a structure for detecting the position of the solenoid 40 and the shaft 43 will be described.

The structure for detecting the position of such a solenoid may be defined in the transmission comprising the driving module as well as the driving module.

That is, the transmission comprises: a driving module that shifts the gear by providing a driving force through a plurality of clutches; a clutch actuator for selectively operating any one of the plurality of clutches: and a control unit for controlling the driving module and the clutch actuator, wherein the driving module comprises a solenoid, and a position detecting sensor for detecting the position of the shaft included in the solenoid by the movement along the central axis direction, wherein the solenoid comprises a sensor magnet arranged such that the N pole is arranged within some or all of the range covering 180 degrees centered around the central axis, and the S pole is arranged within some or all of the range covering the remaining 180 degrees centered around the central axis, and coupled with the shaft to form a magnetic field for detecting the position of the shaft.

Figure 7:
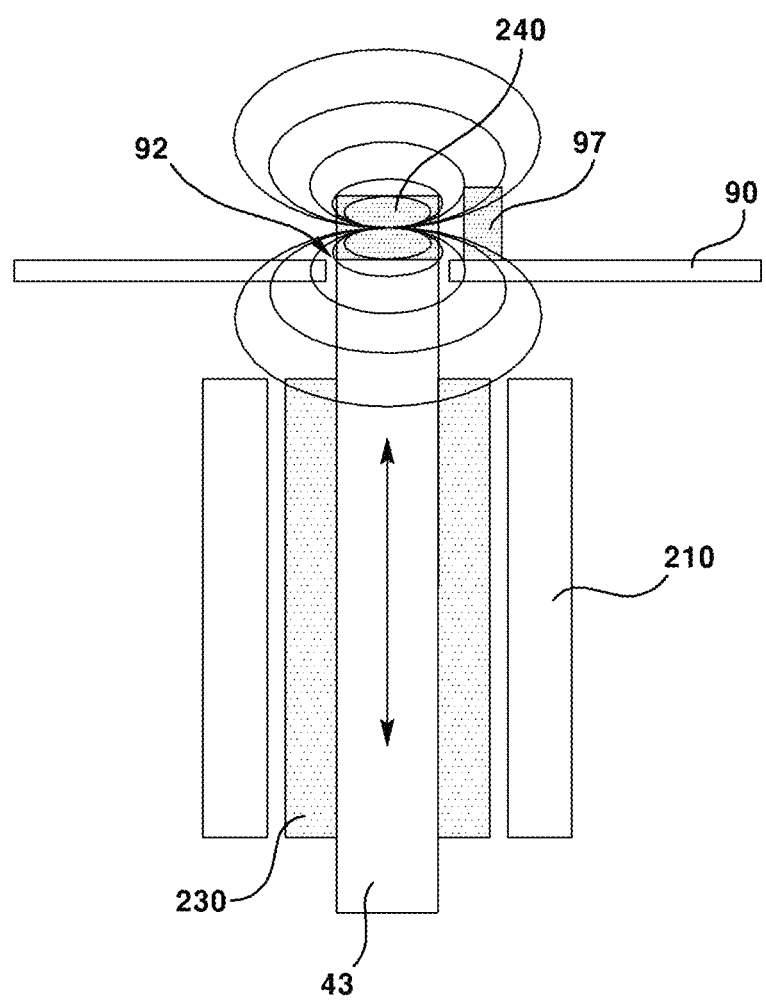
FIG. 7 is a conceptual diagram schematically showing a structure for detecting the position of a solenoid according to the first embodiment of the present invention.

FIG. 7 is a conceptual diagram schematically showing the structure for detecting the position of a solenoid according to the first embodiment of the present invention.

Referring to FIG. 7, a driving module according to an embodiment of the present invention comprises a solenoid, a printed circuit board 90, and a position detecting sensor 97 for detecting the position of the shaft 43 included in the solenoid by the movement along the central axis direction.

The solenoid comprises: a sensor magnet 240 arranged such that the N pole is arranged within some or all of the range covering 180 degrees centered around the central axis, and the S pole is arranged within some or all of the range covering the remaining 180 degrees centered around the central axis, and coupled with the shaft 43 to form a magnetic field for detecting the position of the shaft 43; a stator 210 that is fixed; and a plunger 230 that is a movement relative to the stator 210.

The shaft 43 can be coupled with the plunger 230.

The position detecting sensor 97 is arranged on the printed circuit board 90 such that the detecting surface of the position detecting sensor 97 is perpendicular to the magnetic flux of the magnetic field generated by the sensor magnet 240 on the printed circuit board 90. The position detecting sensor 97 may be implemented in the form of a semiconductor chip. In this case, the position detecting sensor 97 in the form of a semiconductor chip may be arranged on the printed circuit hoard 90 such that the detecting surface is perpendicular to the surface of the printed circuit board 90.

The plunger 230 may be implemented to comprise a magnetic body or be magnetized. And the stator 210 comprises a coil. A current flows in the coil, and a magnetic field is generated by the current. The plunger 230 slidingly moves while maintaining a gap in the stator 210 according to the change of the magnetic field generated in the coils of the plunger 230 and the stator 210. That is, the plunger 230 slidingly moves up and down in the stator 210 due to the interaction between the magnetic field generated by the coil of the stator 210 and the magnetic field generated by the magnetic material of the plunger 230.

Here, the shaft 43 may be movable downward or upward between a first position of the upper limit and a second position of the lower limit in both directions of the central axis in accordance with the movement of the plunger 230. The first position is the position when the shaft 43 is elevated up to the highest point and the second position is the position when the shaft 43 is descended down to the lowest point.

The sensor magnet 240 can be coupled to the end of the shaft 43. The end of the shaft 43 comprising the sensor magnet 240 can move with respect to the stator by penetrating through the hole 92 formed in the printed circuit board 90 on which the position detecting sensor 97 is arranged. Referring again to FIG. 5, the sensor magnet 240 may be positioned in the same plane as the position detecting sensor 97 penetrates through the hole 92 formed in the printed circuit board 90. Therefore, the magnetic flux output from the sensor magnet 240 can vertically enter or exit the detecting surface of the position detecting sensor 97 in the absence of other obstacles. Here, the position detecting sensor 97 may be arranged on the printed circuit board 90 around the hole 92. The sensor magnet 240 penetrates the hole 92 and the position detecting sensor 97 is arranged at any position around the hole so that the position detecting sensor 97 is positioned within a certain distance from the sensor magnet 240. In this case, the predetermined distance is within the maximum detecting distance of the position detecting sensor 97.

The position detecting sensor 97 may be implemented as a three-axis Hall sensor that senses magnetic flux in the X, Y, and Z directions. The Hall sensor is a sensor which operates by a Hall effect, and the Hall sensor is well known in the field of the present invention, therefore a description thereof will be omitted.

Hereinafter, the relative positions of the sensor magnet 240 and the position detecting sensor 97 will be described in detail.

Figure 8:
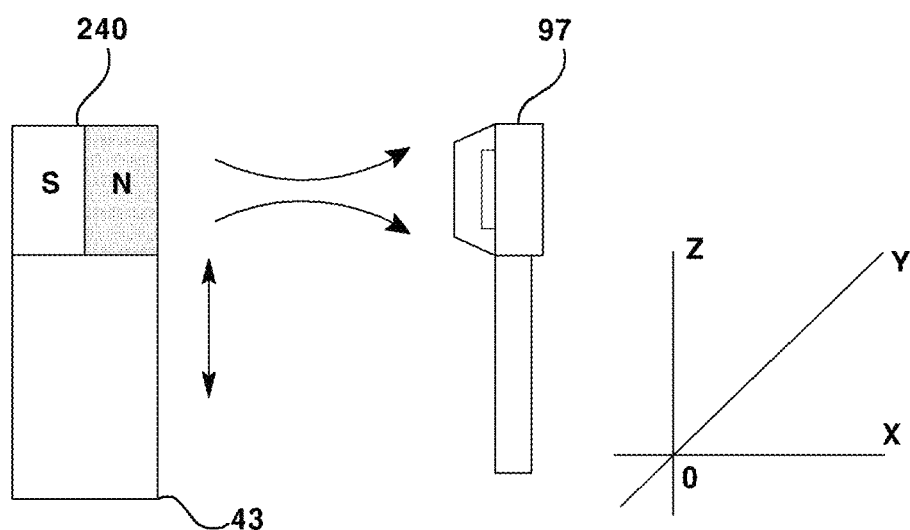
FIG. 8 is a conceptual diagram specifically showing FIG. 6 according to the first embodiment of the present invention.

FIG. 8 is a conceptual diagram specifically showing FIG. 7 according to the first embodiment of the present invention.

Referring to FIG. 8, the structure for detecting the position of the solenoid according to the embodiment of the present invention comprises a sensor magnet 240 and a position detecting sensor 97. The sensor magnet 240 is simply arranged at the end of the shaft 43 of the solenoid and is simplified and displayed as a magnet comprising an N pole and an S pole. Also, the position detecting sensor 97 is arranged such that the detecting surface is oriented towards the N-pole.

The sensor magnet 240 may be arranged at the end portion of the shaft 43 to detect to position of the shaft 43 that moves downward or upward between a first position of an upper limit and a second position of a lower limit along the center axis direction in the vertical direction. The sensor magnet 240 may form a magnetic flux starting, from the N pole and arriving at the S pole. The sensor magnet 240 can move down or up together with the downward movement or upward movement of the shaft 43. That is, the sensor magnet 240 is attached to the shaft 43 and moves together with the shaft 43.

Here, the N pole of the sensor magnet 240 may be formed within some or all of the range covering 180 degrees in the periphery of the central axis. Also, the S pole of the sensor magnet 240 may be formed within some or all of the range covering the remaining 180 degrees in the periphery of the central axis. That is, the N-pole and the S-pole of the sensor magnet 240 may be formed at both ends of a rod-like shape, respectively.

The position detecting sensor 97 can determine the position of the shaft 43 using the magnetic flux formed by the sensor magnet 240. The position detecting sensor 97 can be positioned on the printed circuit board 90 such that the detecting surface of the position detecting sensor 97 and the magnetic flux formed by the sensor magnet 240 are perpendicular to each other.

Referring again to FIG. 8, a coordinate system consisting of X, Y, and Z axes is shown in FIG. 8.

When the N pole and the S pole of the sensor magnet 240 are positioned on the X axis, the center of the position detecting sensor 97 may be spaced apart from the N pole and the S pole on the same X axis. Specifically, the position detecting sensor 97 may be positioned on the X axis at a position spaced apart from the N pole by a predetermined distance within a maximum detecting distance, and may be positioned on the opposite side of the S pole position with respect to the N pole. Referring to FIG. 7, an S-pole, an N-pole, and a position detecting sensor 97 are sequentially arranged on the same X-axis. A magnetic flux emerging from the N pole perpendicular to the detecting surface of the position detecting sensor 97 is displayed.

Figure 9:
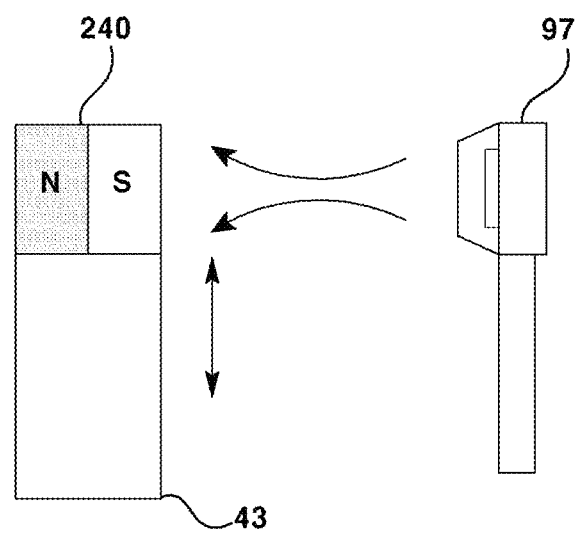
FIG. 9 is a conceptual diagram showing a modified embodiment of the first embodiment of the present invention.

FIG. 9 is a conceptual diagram showing a modified embodiment of the first embodiment of the present invention.

Referring to FIG. 9, when the N pole and the S pole of the sensor magnet 240 are positioned on the X axis, the center of the position detecting sensor 97 can be located spaced apart from the N pole and the S pole by a predetermined distance on the same X axis. Specifically, the position detecting sensor 97 may be spaced apart from the S-pole within a maximum detecting distance on the X-axis by a predetermined distance, and may be positioned on the opposite side of the N-pole position with respect to the S-pole. Referring to FIG. 9, an N pole, an S pole, and a position detecting sensor 97 are sequentially arranged on the same X axis. A magnetic flux entering the S pole perpendicular to the detecting surface of the position detecting sensor 97 is illustrated.

Referring to FIG. 9, an S pole instead of the N pole of the sensor magnet 240 is arranged close to the position detecting sensor 97 as compared with FIG. 8. The positions of the sensor magnet 240 and the position detecting sensor 97 are the same as those of the positions of the N-pole and the S-pole in FIGS. 8 and 9. That is, according to the configuration of FIG. 9, a magnetic flux entering the S-pole can be detected by the position detecting sensor 97.

The N pole and S pole of the sensor magnet 240 and the position detecting sensor 97 are located at the same coordinates on the Y axis.

According to the first embodiment of the present invention, the magnetic flux emitted from the N pole of the sensor magnet 240 or the magnetic flux entering the S pole can be detected by the detecting surface of the position detecting sensor 97 without obstacles. In addition, the orthogonal plane between the position detecting sensor 97 and the magnetic flux can be formed more easily as compared with the prior art. Accordingly, in detecting the rotation or movement of the object such as a shaft 43, the error rate can be reduced and the disturbance in the measurement can be eliminated.

Hereinafter, the position detecting structure of the solenoid according to the second embodiment of the present invention will be described. In this embodiment, the other parts are the same as those in the first embodiment, but there is a difference in the configuration for detecting the position of the solenoid. Therefore, hereinafter, only the characteristic portions of the present embodiment will be described, and the first embodiment will be quoted in the remaining portions.

Figure 10:
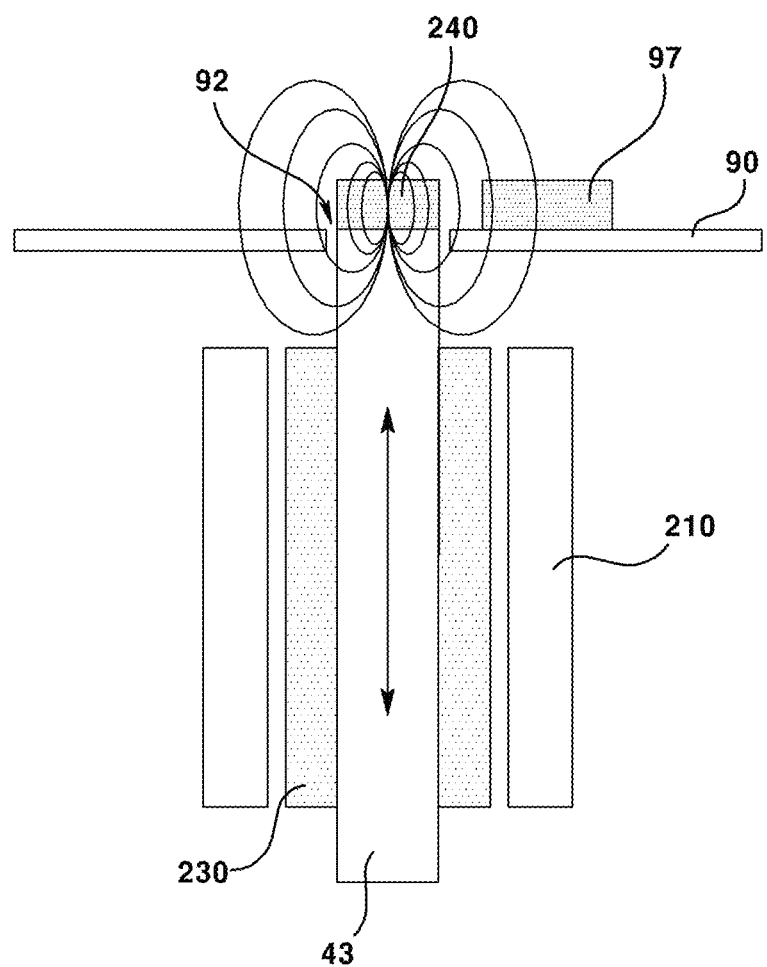
FIG. 10 is a conceptual view schematically showing a structure for detecting the position of a solenoid according to a second embodiment of the present invention.
Figure 11:
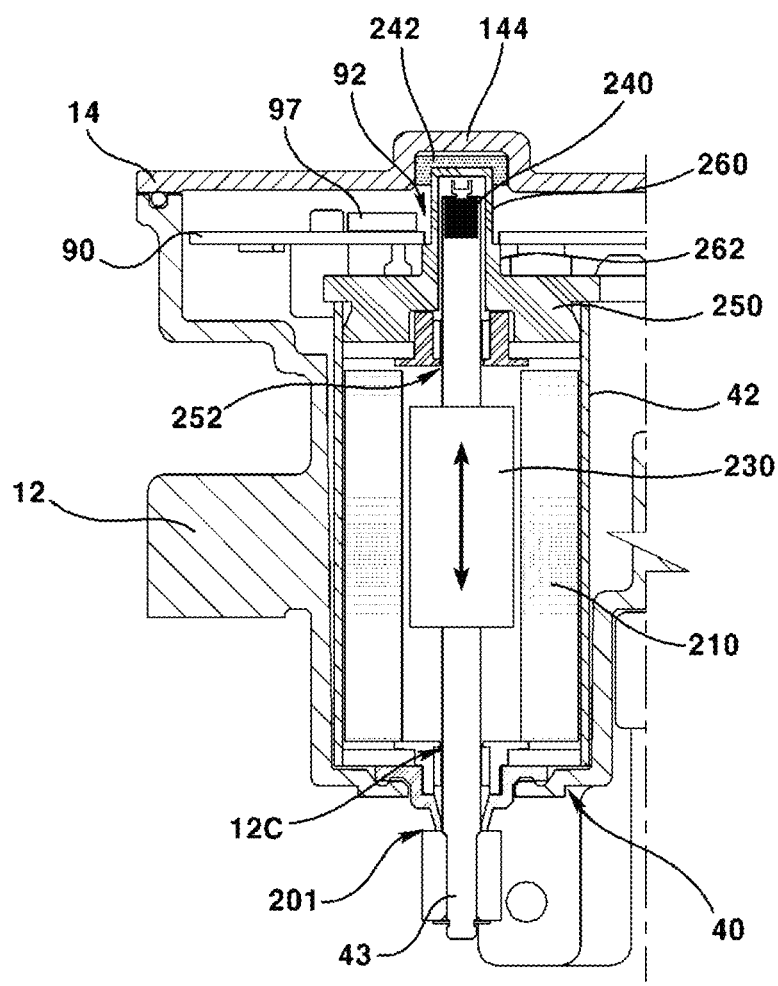
FIG. 11 is a cross-sectional view showing a combined state of a solenoid and a printed circuit board according to the second embodiment of the present invention.
Figure 12:
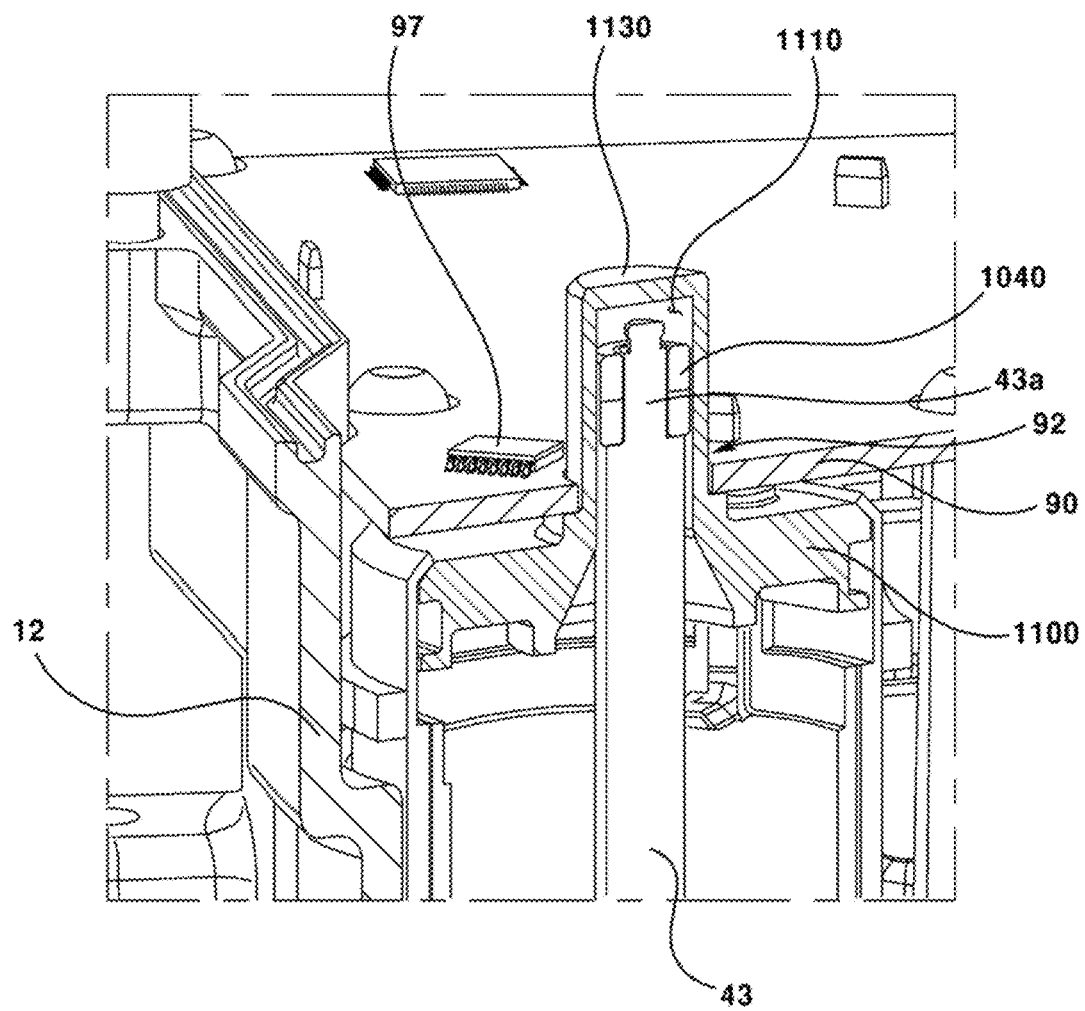
FIG. 12 is a perspective view showing a combined state of a solenoid and a printed circuit board according to the second embodiment of the present invention.

FIG. 10 is a conceptual diagram schematically showing a position detecting structure of a solenoid according to a second embodiment of the present invention, FIG. 11 is a cross-sectional view showing a combination of a solenoid and a printed circuit board according to a second embodiment of the present invention, FIG. 12 is a perspective view showing a combination of a solenoid and a printed circuit board according to a second embodiment of the present invention.

Referring to FIGS. 10 to 12, a solenoid 40 according to the second embodiment of the present invention is arranged inside the housing 12. In detail, the solenoid 40 comprises a solenoid housing 42, a stator 210 arranged inside the solenoid housing 42, a plunger 230 arranged inside the stator 210, a shaft 43 coupled to the plunger 230, and a sensor magnet 240 arranged on the shaft 43.

Figure 2:
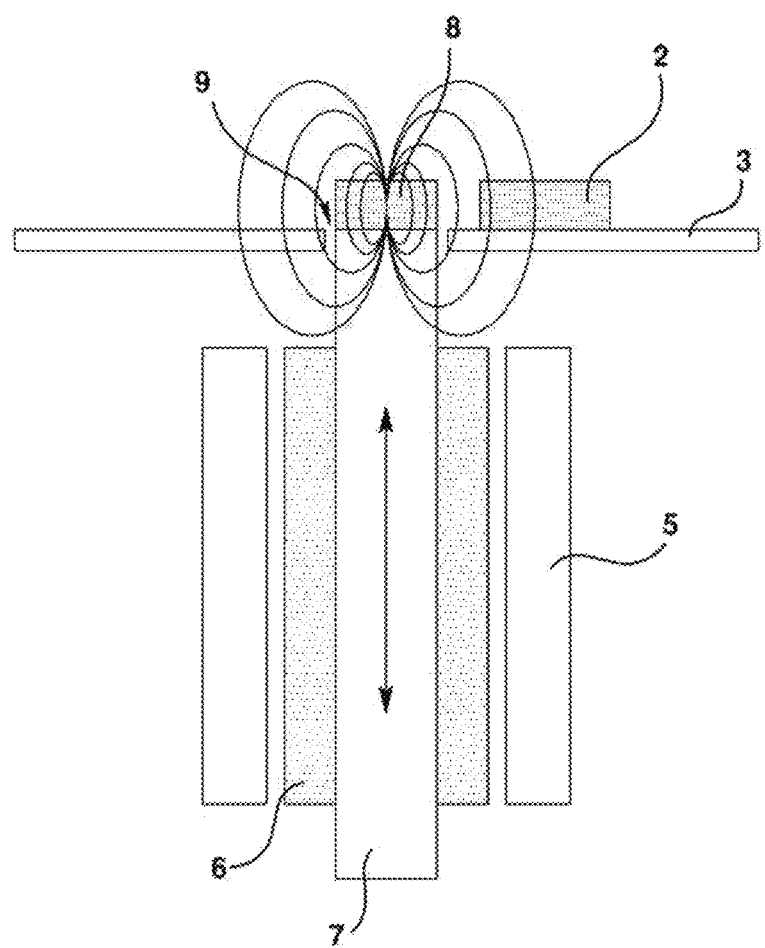
FIG. 2 is a cross-sectional view of yet another structure of the prior art for detecting the position of a solenoid.

External appearance of the solenoid 40 is formed by a solenoid housing 42 and a solenoid cover 250 coupled to an upper side of the solenoid housing 42. An exposure hole 201 for exposing the shaft 43 to the outside is formed on the lower surface of the solenoid housing 42. The exposure hole 201, the through hole 20a, and the insertion hole 92 may be formed to be identical to each other in the axial direction. The end of the shaft 43 extending to the outside of the solenoid housing 42 through the exposure hole 201 and the through hole 20a can be coupled with the shift lever 60 (refer to FIG. 2).

A hole for accommodating the shaft 43 coupled to the plunger 230 is formed in a central region of the stator 210. A coil may be wound around the stator 210 to be electromagnetically coupled with a magnet provided on the plunger 230.

A plunger 230 is arranged inside the stator 210. The plunger 230 is coupled to the outer circumferential surface of the shaft 43 facing the stator 210. The plunger 230 is formed in a shape similar to a cylinder, and may be formed of a magnetic material or a material such as a cold rolled steel sheet (SPCC). Therefore, the plunger 230 moves linearly in the coil by the electromagnetic force generated as current is applied to the coil of the stator 210, and the shaft 43 (not shown) coupled with the plunger 230 can be moved linearly. Here, the linear movement of the shaft 43 means that the shaft 43 moves upward and downward with reference to FIG. 10.

The sensor magnet 240 is coupled to the upper end of the shaft 43. A sensor magnet coupling portion 43a whose cross-sectional area is narrower than the other region is formed at the upper end of the shaft 43 and the sensor magnet 240 can be coupled to the outer circumferential surface of the sensor magnet coupling portion 43a. The cross-sectional area of the sensor magnet coupling portion 43a, to which the sensor magnet 240 is coupled, may correspond to the cross-sectional area of the shaft 43. That is, the outer diameter of the sensor magnet coupling portion 43a is smaller than the outer diameter of the shaft 43, and the outer diameter of the sensor magnet coupling portion 43a may correspond to the inner diameter of the sensor magnet 240.

As shown in FIG. 12, the sensor magnet 240 may be configured as a shape of a plurality of rings having N poles and S poles, respectively. In this case, the diameter of the cross-section of the sensor magnet 240 may be formed to be 5 mm to 15 mm. The height of the sensor magnet 240 may be 4 mm to 10 mm.

The solenoid cover 250 is coupled to the upper side of the solenoid housing 42. An accommodating groove 252 extending upward is formed on the lower surface of the solenoid cover 250 to accommodate the shaft 43 and the sensor magnet 240. Accordingly, the shaft 43 and the sensor magnet 240 can be accommodated in the accommodating groove 252 and linearly moved.

Meanwhile, the solenoid cover 250 is formed with a protruded portion 260 protruding upward from the upper surface. The protruded portion 260 is fitted into the insertion hole 92 of the printed circuit board 90, which will be described later, and can be inserted upward from the lower side of the printed circuit board 90. The protruded portion 260 is provided with a stepped portion 262 in which a lower partial area thereof is stepped. The stepped portion 262 is formed to have a larger cross-sectional area than other regions to support the lower surface of the printed circuit board 90. Therefore, the upper surface of the stepped portion 262 is in contact with the lower surface of the printed circuit board 90, and the protruded portion 260 can be extended above the printed circuit board 90.

The accommodating groove 252 is formed in the protruded portion 260. Accordingly, the accommodating groove 252 may extend upward from the lower surface of the solenoid cover 250 and be formed on the inner side of the protruded portion 260. The shaft 43 and the sensor magnet 240 may be accommodated in the accommodating groove 252.

Meanwhile, the material of the solenoid cover 250 may be a nonmagnetic material which is not affected by the magnetic field. For example, the material of the solenoid cover 250 may be selected from the group consisting of plastic, aluminum, and copper.

The printed circuit board 90 is formed with an insertion hole 92 into which the protruded portion 260 is inserted. The insertion hole 92 may be formed by penetrating through the lower surface from the upper surface of the printed circuit board 90. The diameter of the insertion hole 92 may be larger than the diameter of the protruded portion 260. The shaft 43 is linearly moved within the protruded portion 260 so that the insertion hole 92 can be understood to be inserted into the shaft 43.

A position detecting sensor 97 for detecting the position of the shaft 43 is provided on the upper surface of the printed circuit board 90 and spaced apart from the sensor magnet 240. The position detecting sensor 97 is arranged adjacent to the insertion hole 92 on the upper surface of the printed circuit board 90. The position detecting sensor 97 senses the magnetic force generated in the sensor magnet 240 and senses the position of the shaft 43. The position detecting sensor 97 is a three-axis linear sensor capable of detecting a position in the X-axis, the Y-axis, and the Z-axis direction. The detecting sensor 97 linearly converts two sensed values of the measured values, so that the position can be detected.

The position detecting sensor 97 may be spaced from the center of the sensor magnet 240 by about 8 mm to 18 mm.

Meanwhile, on the lower surface of the cover 14 facing the upper end of the protruded portion 260, a protruded portion seating groove 144 is formed which is recessed upward. The protruded portion seating groove 144 is formed when a portion of the lower surface of the cover 14 is recessed upward, and may accommodate an upper portion of the protruded portion 260. In order to form the protruded portion seating groove 144, the area of the upper surface of the cover 14 where the protruded portion seating groove 144 may be in the form more upwardly protruded than the other area.

A seating member 242 may be provided between the inner circumferential surface of the protruded portion seating groove 144 and the outer circumferential surface of the protruded portion 260 so that the protruded portion 260 is firmly coupled to the protruded portion seating groove 144. The seating member 242 may have an outer circumferential diameter corresponding to the inner circumferential diameter of the protruded portion seating groove 144 and may be embedded in the protruded portion seating groove 144. The solenoid 40 can be firmly fixed within the housing 12 because the protruded portion 260 is inserted in the protruded portion seating groove 144. The material of the seating member 242 may be, for example, an elastically deformable material.

Hereinafter, the process of detecting the position of the shall 43 in the above described solenoid 40 will be described.

Referring to FIGS. 10 to 12, the plunger 230 and the shaft 43 linearly move upward and downward by the interaction of the plunger 230 and the stator 210, as described above.

As the shaft 43 moves, the upper end of the shaft 43 and the sensor magnet 240 may be moved upward and downward while being accommodated in the accommodating groove 252. The position detecting sensor 97 senses the magnetic force generated from the sensor magnet 240 and detects how much the shaft 43 is being moved.

For example, a total travel path of the shaft 43 is calculated by dividing the point at which the shaft 43 can be located from the uppermost side to the lowermost side. By relating the maximum and minimum values of the magnetic force being detected at the sensor magnet 240 in consideration of the movement path, the position of the shaft 43 that moves linearly can be detected.

Hereinafter, a transmission provided with a driving module 100 will be described.

Figure 13:
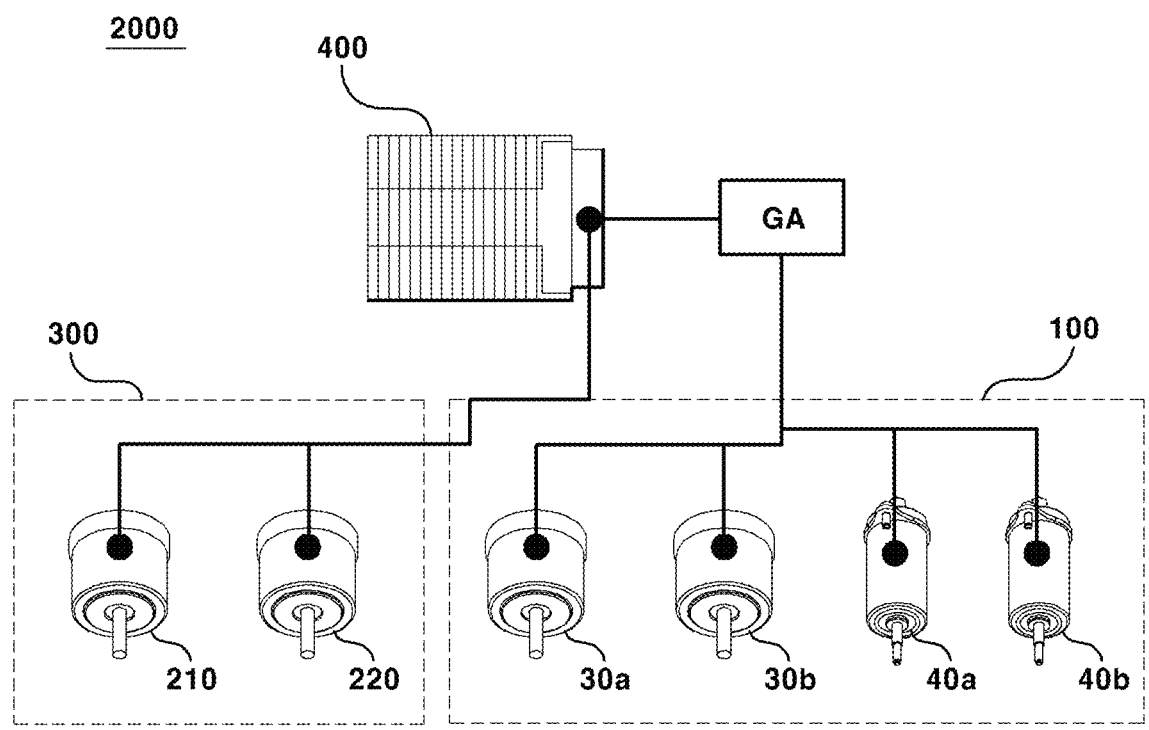
FIG. 13 is a system diagram illustrating a system of a transmission according to an embodiment of the present invention.

FIG. 13 is a system diagram illustrating a system of a transmission according to an embodiment of the present invention.

As described above, the driving module 100 according to the embodiment of the present invention is a gear actuator that shills gears among the transmissions 2000 as an example. On the other hand, the transmission 2000 of the present embodiment can be configured to comprise any one of the transmission according to the above-described first embodiment and the transmission according to the second embodiment.

The transmission 2000 according to the present embodiment comprises a driving module 100 that shifts gears by providing a drive force through a plurality of clutches and a clutch actuator 300 for operating the driving module 100 and alternatively operating any one of the plurality of clutches; and a control unit 400 for controlling the clutch actuator 300 and the driving module 100.

And controls the overall operation of the transmission 2000 of the control unit 400. For example, the driving module 100 may change the driving speed of the driving module 100 to have a proper gear ratio according to the speed change of the vehicle.

The clutch actuator 300 comprises a plurality of clutch motors 210 and 220. The number of the clutch motors 210 and 220 may be two, corresponding to the number of the motors 30 and the solenoids 40, which are two. The first clutch motor 210 of the plurality of clutch motors 210 and 220 is understood to be a motor for controlling the operation of the first motor 30a and the first solenoid 40a for converting the odd-numbered gear. The second clutch motor 220 is understood to be a motor for controlling the operation of the second motor 30b and the second solenoid 40b for converting the even-numbered gear.

In other words, the first motor 30a and the first solenoid 40a are understood as the first clutch, the second motor 30b and the second solenoid 40b are understood as the second clutch. Therefore, by the plurality of clutch motors 210 and 220, the respective clutches can be alternatively selected for operation.

For example, when assuming that the driver starts driving in a state where the gear is initially in the neutral position, the first clutch motor 210 becomes turned ON state and the second clutch motor 220 is turned OFF state. According to the ON state of the first clutch motor 210, the first motor 30a and the first solenoid 40a may be operated with a first-stage gear in the odd-numbered gear unit by the operation of the first motor 30a and the first solenoid 40a (at this time, the second motor 30b and the second solenoid 40b is being standby with the input shaft in the state of second-stage in the even-numbered gear unit). Next, as the speed increases, the first clutch motor 210 is turned OFF, and the second clutch motor 220 is turned ON. At this time, depending on the state of the second clutch motor 220 being turned ON, the second motor 30b and the second solenoid 40b may be operated with a second-stage gear in the even-numbered gear unit. Here, the ON state and the OFF state are understood as the power transmitting and blocking states.

Accordingly, the clutch actuator 300 and the gear actuator 100 can shift the gear to an appropriate gear ratio through an operation in consideration of the vehicle speed, in accordance with the control command of the control unit 400.

According to the driving module 100 and the transmission 2000 according to the above described configuration, insertion holes for inserting the solenoids into the printed circuit board 90 are formed, so that a separate space between the printed circuit board 90 and the solenoid become unnecessary, and thus there is an advantage that the product can be more miniaturized.

Since the position detecting sensor 97 is arranged on the upper surface of the printed circuit board 90 to detect the magnetic force of the sensor magnet 240 coupled to the end of the shaft 43, and thus there is an advantage that the positional change of the shaft 43 can be detected more easily.

Further, by forming a seating groove wherein the solenoid is concavely inserted in the inner surface of the housing, the solenoid can be more firmly supported inside the housing.

Hereinafter, a driving module according to a third embodiment of the present invention will be described. The present embodiment is the same as the first and second embodiments in the other portions, however, there is an additional feature in the power transmission structure related to the solenoid. Therefore, only the featured parts of the present embodiment will be described hereinafter, and for the remaining parts, the first and second embodiments will be quoted.

Referring to FIG. 3, a lever coupling portion 24 is provided on one side of the lower surface of a second accommodating portion 21 so as to couple with a shift lever 60 (FIG. 14) for selecting operation of a gear. The lever coupling portion 24 comprises a body 25 protruding downward from the lower surface of the second accommodating portion 21 and a first coupling hole 26 wherein a coupling pin 68 (FIG. 14) is inserted on the body 25. Corresponding to the number of the solenoids 40, the lever coupling portion 24 are also provided on the lower surfaces of the plurality of second accommodating portions 21, respectively.

Meanwhile, at least one separate screw hole may be formed at the periphery of the second space 13 for coupling with other structures.

Hereinafter, the configuration of the shift lever 60 will be described.

Figure 14:
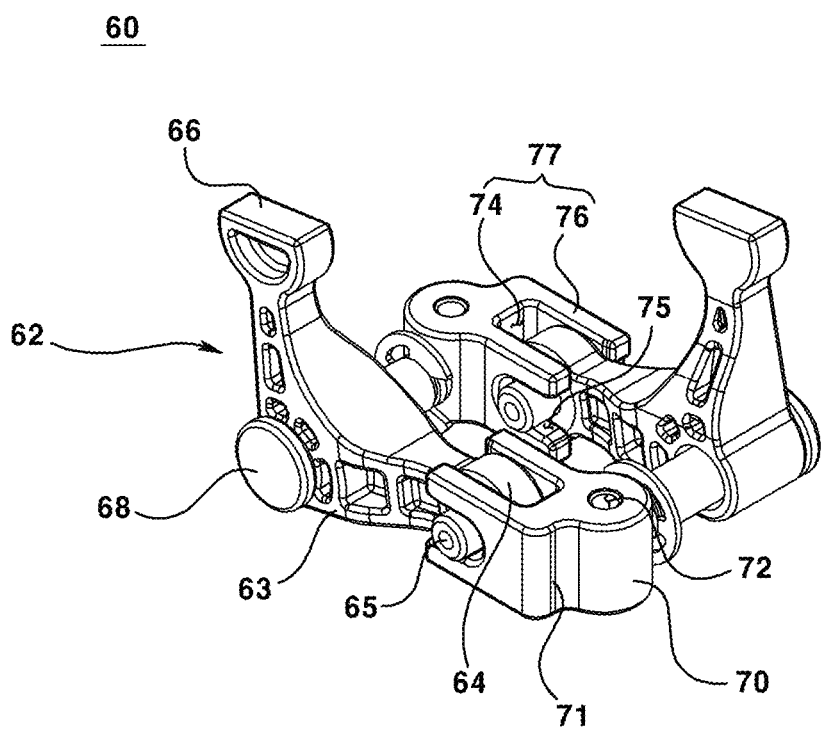
FIG. 14 is a perspective view showing a state of a shift lever according to a third embodiment of the present invention.

FIG. 14 is a perspective view showing a state of a shift lever according to a third embodiment of the present invention.

Referring, to FIGS. 3, 6 and 14, the shift lever 60 is coupled with the lower side of the case 10. In detail, the shift lever 60 is coupled with the lever coupling portion 24 provided in the second accommodating portion 21 of the housing 12.

The shift lever 60 comprises a solenoid coupling portion 70 coupled to the driving shaft 43 of the solenoid 40, a lever 62 which is coupled to the solenoid coupling portion 70 and rotated according to the operation of the solenoid coupling portion 70, and a coupling pin 68 which couples the lever 62 to the lever coupling portion 24.

The solenoid coupling portion 70 comprises a coupling body 71 formed with a coupling hole 72 in which the driving shaft 43 is inserted and a guide 77 extending from a coupling body 71 in the outer peripheral direction wherein a mounting groove 74 into which the lever 62 is inserted is formed The coupling body 71 is formed with a coupling hole 72 penetrating through a central region of the upper surface from a central region of the lower surface. The driving shaft 43 is inserted into the coupling hole 72. The driving shaft 43 is fixed as being inserted into the coupling hole 72 and the solenoid coupling portion 70 moves together with the linear movement of the driving shaft 43.

The guide 77 is configured in the form of a plurality of plates 76 extending in parallel from the outer circumferential surface of the coupling body 71 so as to form a mounting groove 74 in which the lever 62 is inserted. That is, it is understood that the mounting groove 74 is formed so that the upper and lower portions thereof are open and the left and right sides are partitioned by the plurality of plates 76.

And then, each of the plurality of plates 76 is formed with a guide groove 75 into which a latching portion 65 to be described later is inserted. The guide groove 75 may be understood as a hole through which a part of the inner circumferential surface of the mounting groove 74 penetrates toward the outer surface. The guide groove 75 is recessed from the end of the plurality of plates 76 in the direction of the coupling body 71 so to form the first rotation center of the lever 62 when the latching portion 65 is inserted.

The cross-section of the lever 62 is formed in the shape of approximately letter '¬' and has one end coupled to the solenoid coupling portion 70 and the other end is coupled to a selecting shaft 750 (see FIG. 16), which will be described later.

The lever 62 comprises a lever body 63, a rotating portion 64 forming one end of the lever body 63 and coupled with the solenoid coupling portion 70, and a selecting shaft coupling portion 66 coupled to the selecting shaft 750.

A second coupling hole (not shown) is formed on the lever body 63 for coupling with the lever coupling portion 24 formed on the lower surface of the housing 12. The coupling pin 68 is coupled with the first coupling hole 26 and the second coupling hole 26 so that the lever coupling portion 24 and the lever 62 are coupled with each other. At this time, it is understood that the coupling pin 68 forms the center of rotation of the lever 62 according to the operation of the solenoid 40.

The rotating portion 64 is inserted into the mounting groove 74 of the solenoid coupling portion 70. The width of the rotating portion 64 corresponds to the length of the width of the solenoid coupling portion 70 so that only the upward and downward movements are obtained on the basis of FIG. 5 when the rotating portion 64 is coupled with the solenoid coupling portion 70. And then latching portions are protrudedly formed on both side surfaces of the rotating portion 64 so as to be inserted into the guide groove 75 so that the rotation center of the rotating portion 64 is formed in accordance with the rotation of the lever 62, thereby fixing the rotating portion 64 to the inside of the mounting groove 74.

The selecting shaft coupling portion 66 is coupled to a selecting shaft 750, which will be described later, to deliver the driving force provided from the solenoid 40 to the selecting shaft 750.

Hereinafter, a process of converting the gears of the driving module 100 will be described.

Figure 15:
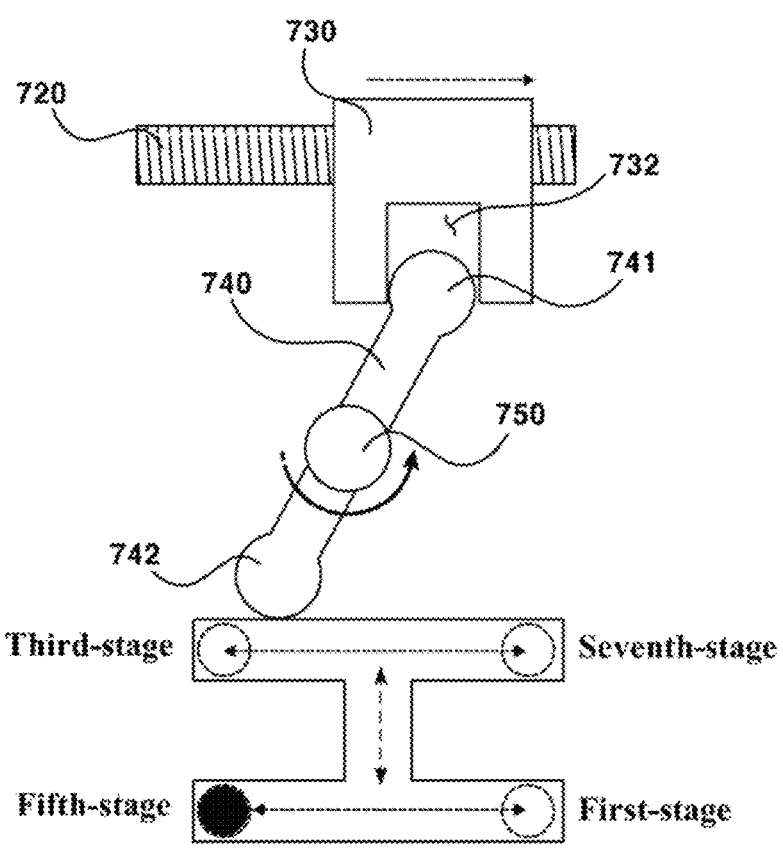
FIG. 15 is a conceptual diagram showing a configuration for shifting a driving module according to the third embodiment of the present invention.
Figure 16:
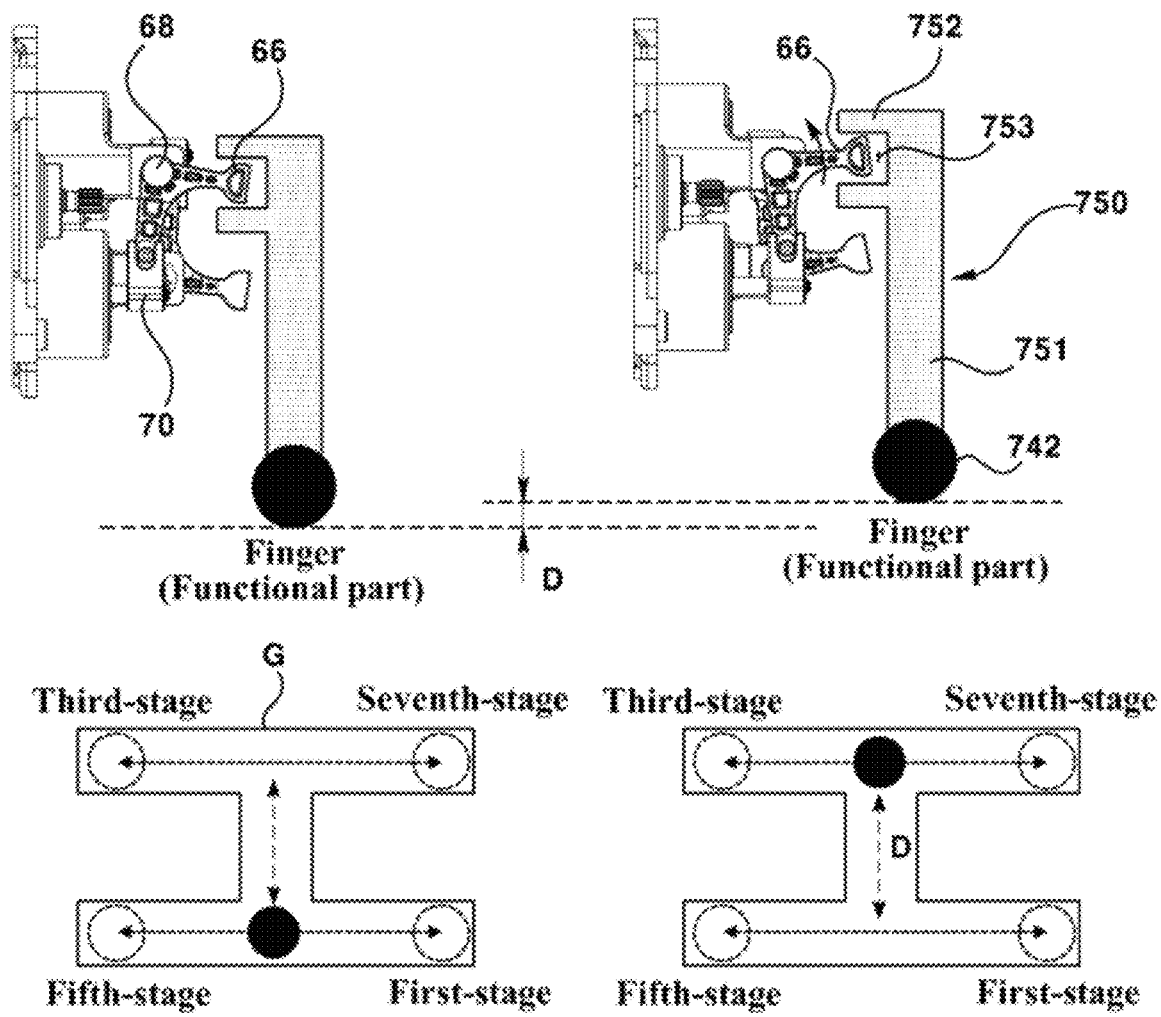
FIGS. 16 and 17 are cross-sectional views showing a shifting process according to the third embodiment of the present invention.
Figure 17:
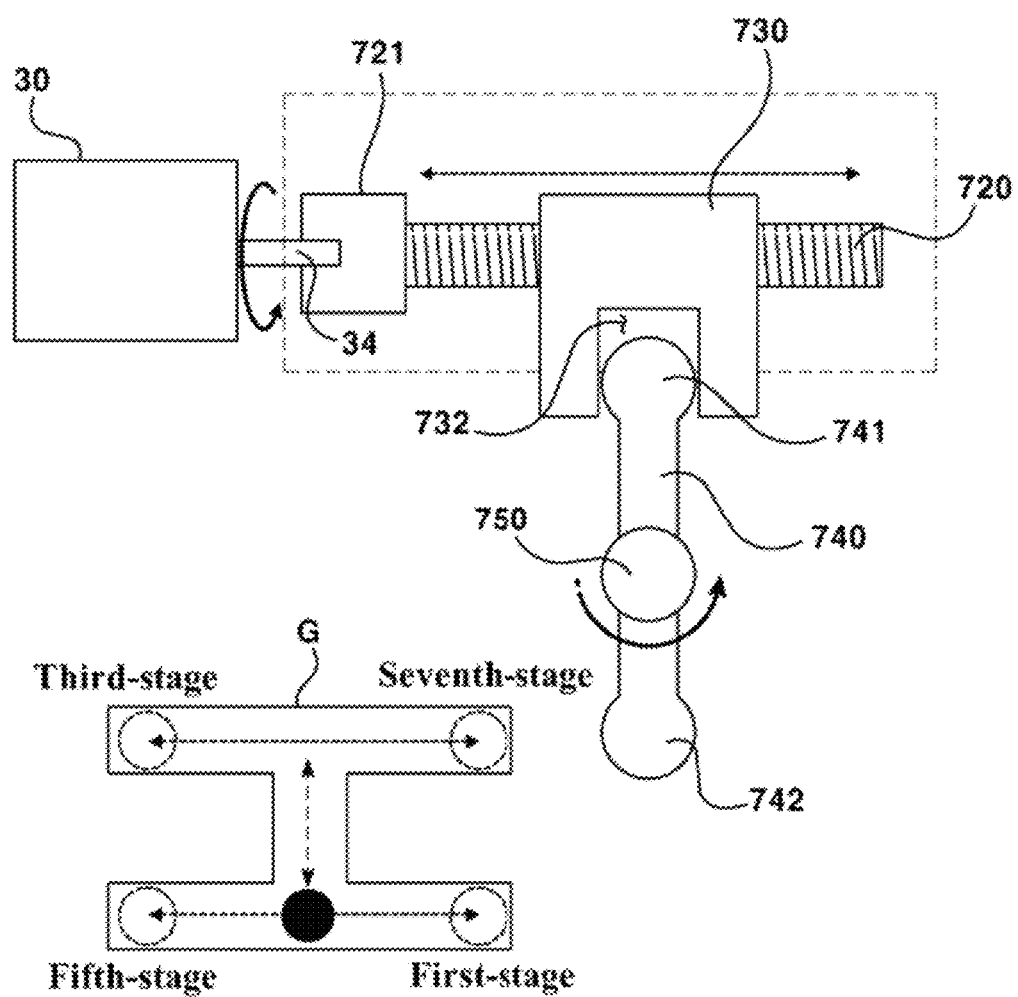

FIG. 15 is a conceptual view showing a configuration for shifting a driving module according to a third embodiment of the present invention, and FIGS. 16 and 17 are cross-sectional views showing a shifting process according to the third embodiment of the present invention.

Referring to FIG. 15, a connecting gear 720 is coupled to a rotating shaft 34 of the motor 30 through a connecting portion 721. That is, the connecting gear 720 is coupled to rotate together with the rotation of the rotation shaft 34.

The connecting gear 720 is formed in a shaft shape having a circular section and a thread on the outer circumferential surface. A guide gear 730 is coupled to the connecting gear 720 so that the connecting gear 720 is moved in the longitudinal direction of the connecting gear 720 according to the rotation of the connecting gear 720. The guide gear 730 has a coupling hole (not shown) corresponding to a cross-sectional shape of the connecting gear 720, and the connecting gear 720 is inserted into the coupling hole. At this time, it is understood that a thread groove corresponding to the thread of the connecting gear 720 is formed on the inner peripheral surface of the coupling hole, and the connecting gear 720 and the guide gear 730 are screw-coupled together.

Accordingly, as the connecting gear 720 is rotated through the rotational force of the motor 30, the guide gear 730 that is threaded is reciprocated in one direction or the other direction along the lengthwise direction of the connecting gear 720. The direction of movement of the connecting gear 720 is determined according to the rotating direction of the motor 30.

On the outer surface of the guide gear 730, a guide groove 732 is formed in which an input shaft 740 for converting gears is inserted. The guide gear 730 is recessedly formed toward the inside on the surface of the outer surface facing the gear unit G, so that one end of the input shaft 740 is coupled to the guide groove 732.

The input shaft 740 is provided at its end with a manipulating protrusion 742 for setting the gear of the gear unit G. A guide protrusion 741 is formed at one end of the input shaft 740 to fit into the guide groove 732 and the manipulating protrusion 742 is formed at the other end to set the gear of the gear unit G. The guide protrusion 741 and the manipulating protrusion 742 may have a relatively larger cross-sectional area than the central region.

The guide protrusion 741 is formed in a shape corresponding to the sectional shape of the guide groove 732 and is seated in the guide groove 732. Therefore, the guide protrusion 741 is restricted to the inside of the guide groove 732 even when the input shaft 740 is moved.

The manipulating protrusion 742 moves along a path forming each end of the gear unit G and is located in the gear which is set according to the inputted control command. In FIG. 7, an example wherein the gear unit G is an odd-numbered gear unit is illustrated.

Explaining the shifting process with reference to FIGS. 15 to 17, when the manipulating protrusion 742 is moved from the neutral position (FIG. 15) to the first-stage on the gear unit G (FIG. 16), the first motor 30a are operated so that the guide gear 730 is adjacent to the first motor 30a. That is, since the guide gear 730 and the connecting gear 720 are screwed together, the connecting gear 720 rotates in the direction adjacent to the motor 30a in accordance with the rotation of the guide gear 730.

Since the center of the input shaft 740 is restricted by the selecting shaft 750, the other end of the input shaft 740, that is, the manipulating protrusion 742 is moved to a position symmetrical to the guide protrusion 741 with reference to the selecting shaft 750. Therefore, the gear can be converted into the first-stage in accordance with the movement of the guide protrusion 741.

Next, when the gear is shifted to the fifth-stage, the connecting gear 720 is rotated so that the guide gear 730 is moved in a direction away from the motor 30a. Accordingly, the guide protrusion 741 is similarly moved away from the motor 30a, and the manipulating protrusion 742, which is symmetrical with respect to the selecting shaft 750, can be moved toward the fifth-stage on the gear unit G.

Figure 18:
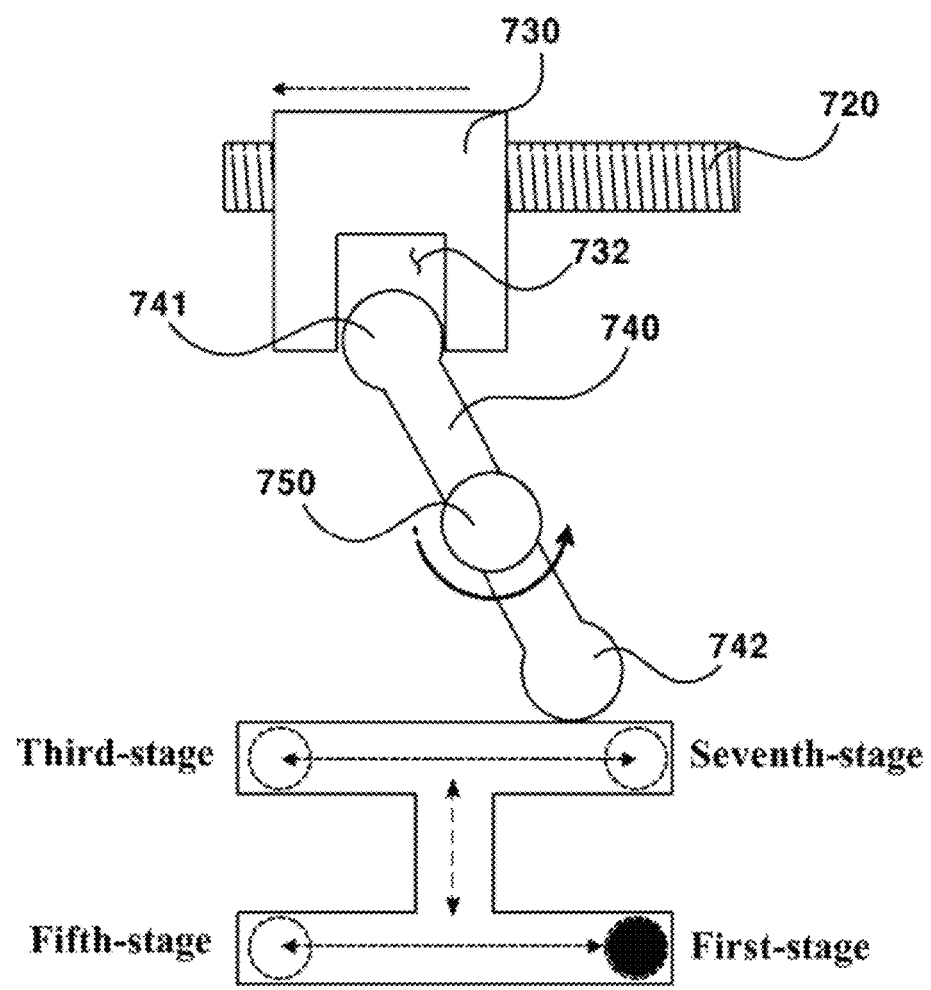
FIG. 18 is a cross-sectional view showing a selecting process according to the third embodiment of the present invention.

FIG. 18 is a cross-sectional view illustrating a selecting process according to an embodiment of the present invention.

In FIG. 18, on the odd-numbered gear unit, the manipulating protrusion 742 is selected to a neutral path between the third-stage and seventh-stage from the neutral path between the first-stage and fifth-stage.

Referring to FIGS. 15 and 18, the selecting shaft 750 is coupled to the selecting shaft coupling portion 66 of the lever 62. As described above, the selecting shaft 750 is coupled to the input shaft 740 in a direction orthogonal to the center of the input shaft 740. The coupling of the input shaft 740 and the selecting shaft 750 may be formed by forming a hole in one of the shafts and inserting the other shaft in the hole.

A lever coupling portion 752 is provided on a portion of the outer surface of the selecting shaft 750 which is coupled with the lever 62. The lever coupling portion 752 is provided with a coupling groove 753 into which the selection shaft coupling portion 66 is inserted and when the lever 62 and the selecting coupling shaft 750 are coupled, the selecting shaft coupling portion 66 is inserted into the coupling groove 753.

The selecting process will be described below. The driving shaft 43 performs a linear motion according to the driving of the solenoid 40. The solenoid coupling portion 70 is also moved upward and downward (refer to FIG. 5) along with the linear movement of the driving shaft 43. At this time, one end of the lever 62 is rotated about the latching portion 65 as a center of rotation, and as a reaction to this, the other end of the lever 62, that is, the selecting shaft coupling portion 66 is also rotated about the coupling pin 68 as a rotation center. The turning radius of the selecting shaft coupling portion 66 may be set to move by a distance D that is the distance that the manipulating protrusion 742 is selected on the gear unit G.

Accordingly, with reference to FIG. 18, the selecting shaft 750 receives a driving force from the lever 62 and performs a vertical movement to be selected. As a result, the shift path on the gear unit G can be selected for the manipulating protrusion 742.

According to the driving module 100 and the transmission 1000 having the above described configuration, there is an advantage that the module may become more miniaturized and compact by providing a plurality of parts in the single housing.

In addition, there is an advantage that the number of required wires and parts can be reduced by mounting a motor and a solenoid, which are conventionally connected with wires, in a single control driver and transmitting a control command. Accordingly, there is an advantage that the manufacturing cost also can be reduced.

Further, by forming a space portion in which each electronic component is arranged in the housing, an unnecessary space disappears and the manufacturing process is facilitated.

It should be noted that the exemplary embodiments disclosed in the drawings are merely examples of specific examples for the purpose of understanding, and are not intended to limit the scope of the present invention. It will be apparent to those skilled in the art that other modifications based on the technical spirit of the present invention are possible in addition to the exemplary embodiments disclosed herein.

The invention claimed is:

1. A driving module comprising:
   a housing;
   a solenoid comprising a shaft arranged inside the housing so as to make a linear movement; and
   a printed circuit board arranged on the solenoid,
   wherein the solenoid comprises a stator, a plunger arranged inside the stator, a shaft coupled to the plunger, and a sensor magnet arranged on the upper side of the shaft,
   wherein the printed circuit board comprises a hole penetrated by the shaft and a position detecting sensor arranged on the printed circuit board to be adjacent to the hole, and
   wherein the housing is formed with an exposure hole through which the shaft of the solenoid protrudes.

2. The driving module according to claim 1, wherein the printed circuit board is arranged between the position detecting sensor and the solenoid.

3. The driving module according to claim 1, wherein the shaft moves downward or upward between a first position of an upper limit and a second position of a lower limit in both directions of the central axis of the shaft in accordance with the movement of the plunger.

4. The driving module according to claim 1, wherein the position detecting sensor is a three-axis Hall sensor for detecting magnetic flux in X, Y, and Z directions.

5. The driving module according to claim 4, wherein the sensor magnet comprises an N pole and an S pole,
   wherein the N pole and the S pole of the sensor magnet are arranged on the X axis, and
   wherein the position detecting sensor is spaced apart from the sensor magnet by a predetermined distance.

6. The driving module according to claim 5, wherein the N pole of the sensor magnet is arranged to face the position detecting sensor.

7. The driving module according to claim 1, further comprising a cover arranged on the upper side of the housing.

8. The driving module according to claim 7, wherein a protrusion seating groove is formed on a lower surface of the cover to be depressed upwardly corresponding to the position of the shaft.

9. The driving module according to claim 8, wherein a seating member is provided between the protrusion seating groove and the shaft, and
   wherein an outer diameter of the seating member corresponds to an inner diameter of the protrusion seating groove.

10. The driving module according to claim 8, wherein a region of the upper surface of the cover where the protrusion seating groove is formed protrudes more upwardly from the other region.

11. The driving module according to claim 1, wherein a shift lever is coupled to an end of the shaft projected through the exposure hole protrudes.

12. The driving module according to claim 1, wherein the exposure hole and the hole are formed in the same axial direction.

13. The driving module according to claim 1, wherein the solenoid further comprises a solenoid cover surrounding the shaft and the sensor magnet.

14. The driving module according to claim 13, wherein the solenoid cover comprises a cylindrical protrusion corresponding to the shape of the shaft, and the protrusion is coupled to the hole.

15. The driving module according to claim 14, wherein the protrusion comprises a stepped portion in which a lower partial area is stepped,
wherein the outer diameter of the stepped portion is larger than the outer diameter of the hole, and
wherein the outer diameter of the protrusion is smaller than the outer diameter of the hole.

16. The driving module according to claim 15, wherein the upper surface of the stepped portion is in contact with the lower surface of the printed circuit board.

17. A transmission comprising:
a driving module for shifting a gear by providing a drive force through a plurality of clutches;
a clutch actuator for selectively operating any one of the plurality of clutches; and
a control unit for controlling the power module and the clutch actuator,
wherein the driving module comprises a housing, a solenoid arranged within the housing and comprising a linearly moving shaft, and a printed circuit board arranged on the solenoid,
wherein the solenoid comprises a stator, a plunger arranged in the stator, a shaft coupled with the plunger, and a sensor magnet arranged on the shaft,
wherein the printed circuit board comprises a hole through which the shaft penetrates,
wherein a position detecting sensor arranged on the printed circuit board and adjacent the hole, and
wherein the housing is formed with an exposure hole through which the shaft of the solenoid protrudes.

18. The transmission according to claim 17, further comprising a cover arranged on the upper side of the housing.

19. The transmission according to claim 18, wherein a protrusion seating groove is formed on a lower surface of the cover to be depressed upwardly corresponding to the position of the shaft.

20. The transmission according to claim 19, wherein a seating member is provided between the protrusion seating groove and the shaft, and
wherein an outer diameter of the seating member corresponds to an inner diameter of the protrusion seating groove.

* * * * *